United States Patent
Pullen et al.

(10) Patent No.: US 9,755,514 B2
(45) Date of Patent: Sep. 5, 2017

(54) CHARGE SHEDDING CIRCUIT

(71) Applicant: QUALCOMM Incorporated, San Diego, CA (US)

(72) Inventors: Stuart Pullen, Raleigh, NC (US); William Rader, Carrboro, NC (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 14/793,147

(22) Filed: Jul. 7, 2015

(65) Prior Publication Data

US 2016/0276932 A1 Sep. 22, 2016

Related U.S. Application Data

(60) Provisional application No. 62/136,352, filed on Mar. 20, 2015.

(51) Int. Cl.
*H02M 1/088* (2006.01)
*H02M 3/158* (2006.01)
*H02M 1/00* (2006.01)

(52) U.S. Cl.
CPC .......... *H02M 3/158* (2013.01); *H02M 1/088* (2013.01); *H02M 3/1588* (2013.01);
(Continued)

(58) Field of Classification Search
CPC ......... H02M 1/088; H02M 2001/0032; H02M 2001/0054; H02M 3/158; H02M 3/1588; Y02B 70/1466; H03K 5/1536
See application file for complete search history.

(56) References Cited

U.S. PATENT DOCUMENTS 8,624,573 B2 * 1/2014 Yu ........................ H02M 3/158
323/285
8,644,041 B2 2/2014 Pansier
(Continued)

FOREIGN PATENT DOCUMENTS

CN 103424609 A 12/2013

OTHER PUBLICATIONS

Abdel-Rahman O., et al., "Analysis and Design of Voltage Regulator with Adaptive FET Modulation Scheme and Improved Efficiency", IEEE Transactions on Power Electronics, vol. 23, No. 2, Mar. 2008, pp. 896-906.

(Continued)

*Primary Examiner* — Fred E Finch, III
*Assistant Examiner* — Demetries A Gibson
(74) *Attorney, Agent, or Firm* — Haynes and Boone, LLP

(57) ABSTRACT

In one embodiment, a method receives a shed comparison signal that is based on a comparison of a voltage detected from a voltage converter to a reference voltage and receives a zero cross signal that indicates whether a current from the voltage converter has crossed zero. The shed comparison signal is sampled for a first number of clock cycles to generate shed comparison sampled values. Also, the zero cross signal is sampled for a second number of clock cycles to generate zero cross sampled values where the second number of clock cycles are less than the first number of clock cycles. The method determines a change between a shed state and an unshed state based on the shed comparison sampled values for the first number of clock cycles or the zero cross sampled values for the second number of clock cycles.

20 Claims, 14 Drawing Sheets

(52) U.S. Cl.
CPC ............ *H02M 2001/0032* (2013.01); *H02M 2001/0054* (2013.01); *Y02B 70/1466* (2013.01); *Y02B 70/1491* (2013.01); *Y02B 70/16* (2013.01)

(56) References Cited

U.S. PATENT DOCUMENTS

| | | | |
|---|---|---|---|
| 2009/0039842 A1 | 2/2009 | Chen et al. | |
| 2009/0184701 A1* | 7/2009 | Yen | H02M 3/156 323/283 |
| 2010/0295528 A1 | 11/2010 | Park et al. | |
| 2012/0293017 A1 | 11/2012 | Lidsky et al. | |
| 2012/0326680 A1* | 12/2012 | Burns | H02M 3/1588 323/224 |
| 2014/0160601 A1* | 6/2014 | Ouyang | H02M 3/158 361/18 |
| 2014/0292292 A1 | 10/2014 | Koski | |
| 2014/0361755 A1* | 12/2014 | Tateishi | H02M 3/158 323/271 |
| 2015/0069983 A1 | 3/2015 | Hawawini et al. | |
| 2015/0084613 A1* | 3/2015 | Ho | H02M 3/1588 323/299 |
| 2015/0338866 A1* | 11/2015 | Hu | H02M 3/157 323/280 |

OTHER PUBLICATIONS

International Search Report—PCT/US2016/021731—ISA/EPO—Jun. 24, 2016.

Luo M., et al., "An Adaptive Segment Output Stage for PWN DC-DC Converter," Solid-State and Integrated Circuit Technology (ICSICT), 2012 IEEE 11th International Conference on, IEEE, Oct. 29, 2012 (Oct. 29, 2012). pp. 1-3. XP032334695, DOI: 10.1109/ICSICT.2012.6467721 ISBN: 978-1-4673-2474-8 A abstract; figures 1,2,3.

Ping L., et al.,"Digital Assistant Current Sensor for PWM DC-DC Converter with Segmented Output Stage," 2013 International Conference on Communications, Circuits and Systems (ICCCAS), IEEE, Nov. 15, 2013 (Nov. 15, 2013), vol. 2, pp. 358-361, XP032578422, DOI: 10.1109/ICCCAS.2013.6765356 [retrieved on Mar. 11, 2014].

Written Opinion—PCT/US2016/021731—ISA/EPO—Jun. 24, 2016.

* cited by examiner

CHARGE SHEDDING CIRCUIT

CROSS REFERENCE TO RELATED APPLICATIONS

Pursuant to 35 U.S.C. §119(e), this application is entitled to and claims the benefit of the filing date of U.S. Provisional App. No. 62/136,352 filed Mar. 20, 2015, the content of which is incorporated herein by reference in its entirety for all purposes.

BACKGROUND

The disclosure relates to voltage converters, and in particular, to a charge shedding circuit.

Unless otherwise indicated herein, the approaches described in this section are not admitted to be prior art by inclusion in this section.

In switch mode power supplies that use multiple phases, one or more of the phases is often shut down at light load to reduce switching losses and improve efficiency. This idea can also apply to a single phase buck converter with large integrated power metal oxide semiconductor field effect transistors (MOSFETS). At light load, sections of the power MOSFETs can be shut off so that the effective gate charge is smaller. This technique, which is called charge shedding or Q shedding, can boost efficiency by a few percent.

In switch mode power converters, light load efficiency is usually accomplished by reducing bias current and skipping pulses. This technique is optimal for very light loads (e.g., <50 ma) where the converter may skip many cycles before turning on. At light to moderate currents, Q shedding is a better way to boost efficiency because the converter can continue switching at its nominal switching frequency while still enjoying the benefit of reduced switching losses.

FIG. 1 shows this effect for different shed ratios. As parts of the MOSFETs are shed, the peak efficiency changes very little, but the current at which the peak occurs falls. In FIG. 1, the buck converter is operating with 5 amps of ripple at 600 kHz. With ⅓ of the MOSFETs switching, the peak efficiency happens when the load is 1.5 amps. When the entire MOSFETs are switching, the peak moves up to 5 amps. The optimal shed point is defined by the intersection of the two curves at 2.65 amps. With the high ripple in the system, detecting this small load current is challenging (the current ripple might be double the shed threshold). Thus, the current must either be averaged or sampled at a definite time within the period to ensure that the measured current is correct.

SUMMARY

In one embodiment, a method receives a shed comparison signal that is based on a comparison of a voltage detected from the voltage converter to a reference voltage and receives a zero cross signal that indicates whether a current detected from the voltage converter has crossed zero. The shed comparison signal is sampled for a first number of clock cycles to generate shed comparison sampled values. Also, the zero cross signal is sampled for a second number of clock cycles to generate zero cross sampled values where the second number of clock cycles are less than the first number of clock cycles. The method determines a change between a shed state and an unshed state based on the shed comparison sampled values for the first number of clock cycles or the zero cross sampled values for the second number of clock cycles.

In another embodiment, a voltage converter includes: switching logic including a plurality of transistors, wherein a portion of the plurality of transistors are switched on and off when the voltage converter changes between a shed state and an unshed state; first comparison logic coupled to a transistor in the plurality of transistors configured to compare a voltage from the voltage converter to a reference voltage, the first comparison logic configured to output a shed comparison signal that is based on a comparison of the voltage from the voltage converter to the reference voltage; second comparison logic configured to determine whether the current from the voltage converter has crossed zero and output a zero cross signal that indicates a current from the voltage converter has crossed zero; first ripple counter logic configured to sample the shed comparison signal for a first number of clock cycles to generate shed comparison sampled values; second ripple counter logic configured to sample the zero cross signal for a second number of clock cycles to generate zero cross sampled values, wherein the second number of clock cycles are less than the first number of clock cycles; and shed signal logic configured to determine a change between the shed state and the unshed state based on the shed comparison sampled values for the first number of clock cycles or the zero cross sampled values for the second number of clock cycles.

In another embodiment, a voltage converter includes: means for receiving a shed comparison signal that is based on a comparison of a voltage detected from the voltage converter to a reference voltage; means for receiving a zero cross signal that indicates whether a current detected from the voltage converter has crossed zero; means for sampling the shed comparison signal for a first number of clock cycles to generate shed comparison sampled values; means for sampling the zero cross signal for a second number of clock cycles to generate zero cross sampled values, wherein the second number of clock cycles are less than the first number of clock cycles; and means for determining a change between a shed state and an unshed state based on the shed comparison sampled values for the first number of clock cycles or the zero cross sampled values for the second number of clock cycles.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

Figure 1:
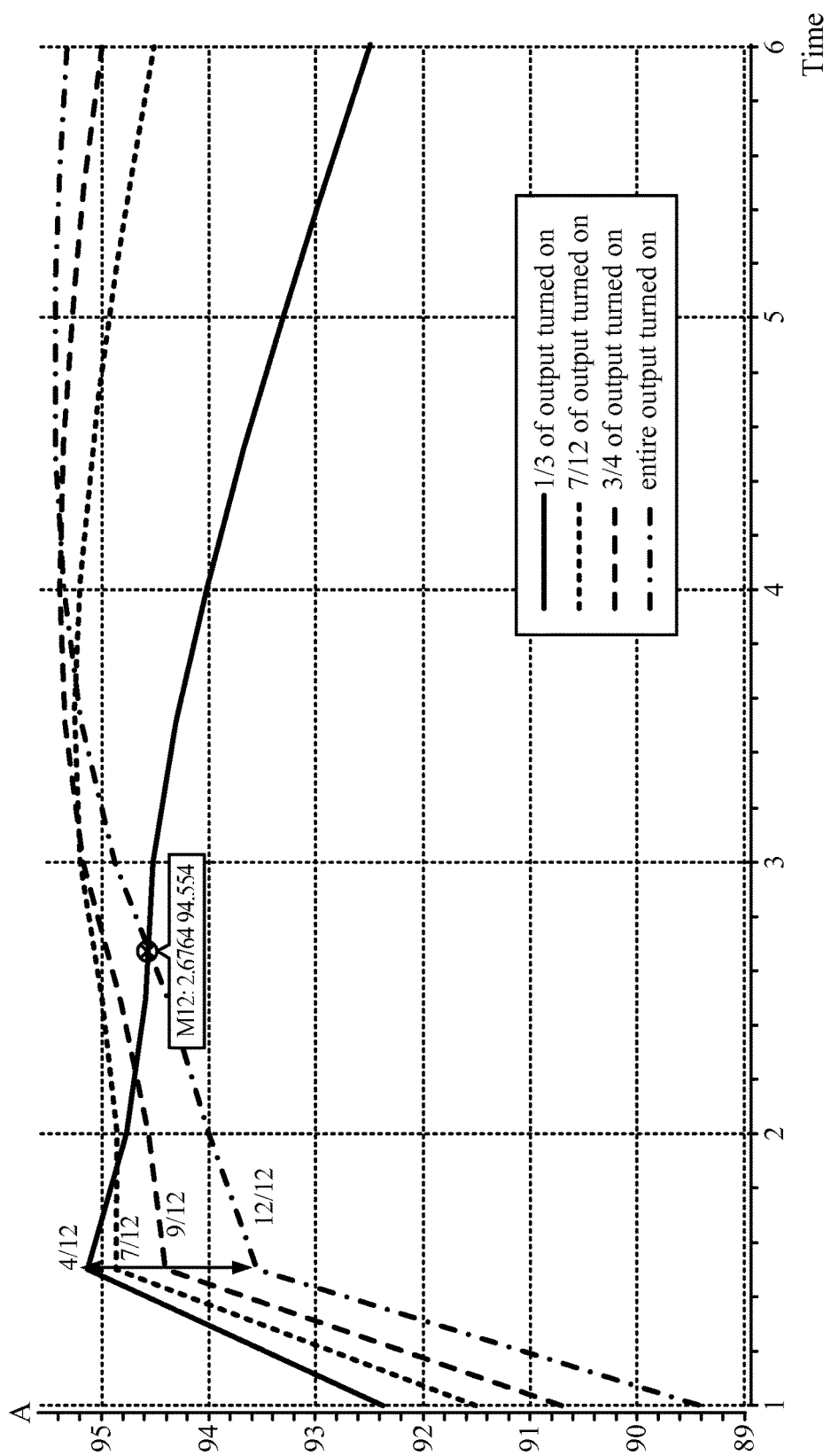
FIG. 1 shows a charge shedding efficiency curve.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Particular embodiments include a detection circuit that detects a voltage across a switching circuit in a voltage converter, such as a buck converter. In one embodiment, the detection circuit detects the voltage across a low-side metal oxide semiconductor field effect transistor (MOSFET), such as an NMOS transistor, in the switching circuit to detect whether a load current is above or below a shed threshold. The shed threshold may be used to determine when the switching circuit should operate in a shed mode/state or an unshed mode/state. The unshed mode may also be referred to as a normal mode of operation. For example, when the load current is light, then the switching circuit operates in a shed mode where some of the MOSFETs in the switching circuit are disabled so that they are always off in shed mode. When the switching circuit moves from the shed mode to the unshed mode, then the MOSFETs are enabled so that they can switch normally (e.g., unshed).

The voltage converter includes a reference voltage generator circuit that can generate an input to a shed comparator. The shed comparator compares the reference voltage to the voltage detected across the low-side MOSFET of the switching circuit. The reference voltage generator circuit may include logic and additional circuits that can adjust the shed reference voltage to keep the shed threshold constant with changes in the NMOS RDSON due to either temperature or the MOSFETs shed/unshed status. The shed comparator outputs a shed comparison signal shed_comp that indicates whether or not the voltage converter should shed or unshed. For those skilled in the art, it is obvious that rather than comparing the NMOS drain voltage to a shed reference voltage, one could compare a reference current to the current detected in the low side MOSFET.

A shed signal generator circuit receives the shed comparison signal, samples the shed comparison signal, and can determine the value of a shed signal. The shed signal indicates to a selection circuit whether to shed or unshed MOSFETs in the switching circuit. That is, the selection circuit may disable some MOSFETs in the switching circuit when in shed mode and enable all MOSFETs when directed to unshed. The shed signal generator circuit delays the changing of the state of the shed signal to eliminate or filter "chatter" from the shed comparison signal shed_comp. That is, the shed signal generator circuit wants to avoid the changing of the state of the shed signal when the shed comparison signal is changing values frequently, such as every couple clock cycles. However, there may be times when the converter should move from an unshed state to the shed state. This may occur when an inductor current goes to zero (e.g., zero cross). In this case, the shed signal generator circuit includes logic using a zero cross signal zero_cross to cause the shed signal to move from an unshed state to a shed state. The shed signal generator circuit samples the status of shed_comp at a specific time during the low side FET on time, because the inductor ripple current is large compared to the shed threshold. In this embodiment, the duty cycle is always less than 50%. So in this case, the shed signal generator circuit samples the signal shed_comp, ½ way through the period.

Particular embodiments also include logic to improve the transient response of the converter by using a current limit signal, ILimit, to initiate the unshedding of the converter. Also, particular embodiments make sure a pulse width modulation (PWM) signal is blanked when performing the shed and unshed operations of the MOSFETS in the switching circuit. The blanking ensures that glitches on the PWM comparator ramp caused by shedding or unshedding do not turn off the high side MOSFETs when the control loop is signaling it to be turned on.

Figure 2:
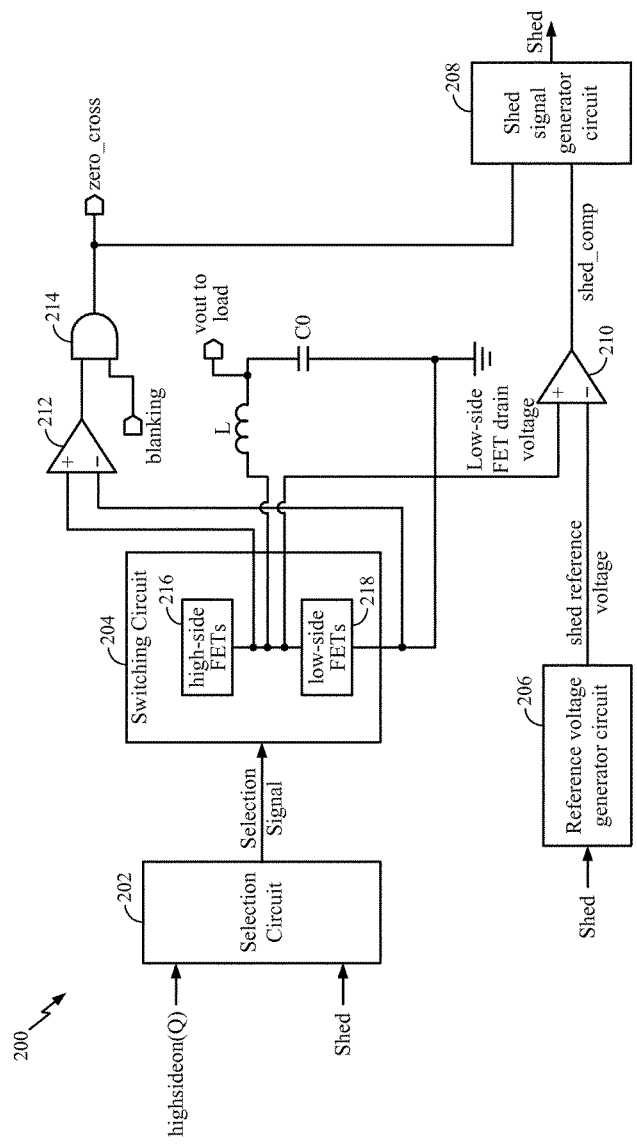
FIG. 2 shows a voltage converter according to one embodiment.

FIG. 2 shows a voltage converter 200 according to one embodiment. The voltage converter may be a direct current (DC)-DC voltage converter, such as a buck converter, but other voltage converters may be used to provide power to a load. Voltage converter 200 includes a selection circuit 202, a switching circuit 204, a reference voltage generator circuit 206, a shed signal generator circuit 208, a shed comparator 210, a zero cross comparator 212, and an AND gate 214.

Selection circuit 202 receives a highsideon(Q) signal and a shed signal. The highsideon(Q) signal indicates whether high-side transistors in switching circuit 204 should be on or not. The shed signal indicates whether or not a portion of the transistors of switching circuit 204 should be disabled or enabled. For example, when in a shed mode, the shed signal is high and some of the transistors of switching circuit 204 are disabled, which means the disabled transistors are turned off and cannot turn on in the shed state. In one embodiment, the shed signal is high at light loads. When the load increases, then the shed signal goes low and the disabled turned off transistors of switching circuit 204 are enabled (unshed).

Switching circuit 204 may include transistors, such as PMOS and NMOS transistors. High-side FETs 216 include PMOS transistors and low-side FETs 218 include NMOS transistors, but other combinations of types of transistors may be used.

High-side FETs 216 and low-side FETs 218 each may include a number of transistors, such as MOSFETs, coupled in parallel. For example, high-side FETs 216 include three PMOS transistors coupled in parallel and low-side FETs 218 include three NMOS transistors coupled in parallel. It will be understood that different numbers of transistors coupled in parallel may be used. When in shed mode, switching circuit 204 may disable and turn off some of the high-side FETs 216 and low-side FETs 218. For example, two-thirds of the transistors in high-side FETs 216 and two-thirds of the transistors in low-side FETs 218 are disabled and turned off when in shed mode. When transitioning to unshed mode, switching circuit 204 enables the disabled and turned off transistors in both high-side FETs 216 and low-side FETs 218.

Converter 200 may supply power to a load via an output Vout. The load current may flow through an inductor L. In one embodiment, the load may be a microprocessor that is situated in an electronic device, such as a server, smartphone, or other communication device. A capacitor CO also may provide current to the output Vout when needed.

Particular embodiments use a low-side NMOS transistor to detect whether a load current is above or below a shed threshold. This may allow converter 200 to detect light load currents. When the low-side NMOS transistor is used for detection, the shed voltage reference—is adjusted as the RDSON of the low-side NMOS transistor changes with shed state in such a way to maintain a constant shed threshold. For example if ⅔ of the NMOS is shed, at a given current the voltage across the MOSFET will increase by a factor of 3. Thus, the voltage reference circuit must increase its voltage by a factor of 3.

The shed reference voltage of reference voltage generator circuit 206 can be changed to track the shed state by switching in/out replica devices or resistors with a fixed reference current, or by increasing the reference current through replica devices or resistors.

The RDSON of the MOSFETs changes with temperature. Reference voltage generator circuit 206 compensates for these changes in RDSON by generating a voltage across a resistor using a bias current with a temperature coefficient (TC) that tracks the NMOS RDSON. Those skilled in the art should recognize that the resistor could also be a small NMOS. In this case, a low TC bias current will result in the correct tracking of the reference voltage. The intent is to make sure that the shed threshold does not change with temperature as the RDSON of the MOSFET varies with temperature.

Shed comparator 210 compares the voltage across the low-side NMOS transistor with the shed reference voltage. Shed comparator 210 generates a shed comparison signal shed_comp that indicates whether the low-side NMOS transistor current indicates converter 200 should be in shed mode. In one embodiment, the shed comparison signal shed_comp is low when the low-side NMOS drain voltage is above the shed reference voltage and high when the low-side NMOS transistor drain voltage is lower than the shed reference voltage. As mentioned earlier, if the ripple current is large compared to the shed threshold, the signal shed_comp will always transition from high to low while the NMOS is turned on at light loads. Thus, shed signal generator circuit 208 samples the signal shed comp at a specific time in the period. Only at this sample time is the comparator output a true indicator of whether or not converter 200 should operate as in the shed or unshed state.

The current detected through the low-side NMOS transistor can change on a cycle by cycle basis due to minute changes in the load, jitter in the control loop and clock and system noise. This may cause the shed comparison signal to chatter. It is very undesirable to change shed state under these conditions. Particular embodiments may provide hysteresis in the comparator 210 and filter logic and ripple counter logic inside shed signal generator circuit 208 to avoid jumping between the shed mode and the unshed mode operation at a constant load.

Shed signal generator circuit 208 receives the shed comparison signal and outputs the shed signal. The shed signal indicates to selection circuit 202 whether to operate in shed mode where some of the MOSFETs in switching circuit 204 are disabled or to unshed where the disabled MOSFETs are enabled to go back to normal operation (e.g., unshed).

Converter 200 includes a zero cross circuit that turns off the low side MOSFET when the inductor current drops to zero to boost efficiency. This normally only happens during a light load and results in discontinuous inductor current (refer to FIG. 3). Using the low-side MOSFET as a shed detect sense element may cause problems if the low-side MOSFET is turned off shortly after turn on at very light load. The drain voltage on the low side FET cannot be used for current sensing to determine a shed/unshed state if it is turned off before the shed comparator 210 is sampled. Zero cross comparator 212 measures the voltage across the low-side FETs 218 and tells the NMOS to turn off when the inductor current has crossed zero (e.g., gone to zero or negative). Zero cross comparator 212 outputs a signal into AND gate 214 (other logic may also be used) that is high when the zero cross is detected. AND gate 214 outputs the zero cross signal when the inductor current is detected to be zero and the blanking time has expired. If the zero_cross signal is high before a valid reading of shed_comp can be sampled by the shed signal generator circuit 208, then shed signal generator circuit 208 will use the zero_cross information instead of the shed_comp information to determine the appropriate shed/unshed state.

Shed signal generator circuit 208 receives the shed comparison signal and the zero cross signal, and outputs the shed signal. Shed signal generator circuit 208 contains logic in the form of ripple counters and latches to ensure that the sampled shed signal is stable before changing the state of the converter 200.

The shed_comp and zero_cross signals are synchronized to the system clock, passed through a ripple counter and multiple values of the counter must be in the same state before the shed output signal of shed signal generator circuit 208 will change state. The ripple counter clock determines where both shed_comp and zero_cross are sampled within the period. The sampling and filtering process creates an unavoidable delay. For example, the shed comparison signal is delayed by first ripple counter and the zero cross signal is delayed by second ripple counter with less flip flops. Logic inside 208 monitors the ripple counter states over several clock cycles. If all values are equal then a latch can be set or reset to change shed state. If all values are not equal, circuit 208 holds its current shed state. In one embodiment, a set/reset latch toggles the shed signal based on the outputs of three consecutive flip-flops in the ripple counter having the same level for the shed comparison signal. Also, shed signal generator circuit 208 may change the state of the shed signal when the zero cross signal indicates inductor current has gone to zero. In one embodiment, because converter 200 should move to a shed state when the zero crossing occurs, the zero cross ripple counter has less bits than the shed_comp ripple counter, such as if the zero cross signal has the same value for two consecutive clock cycles it can force a shed event.

Figure 3:
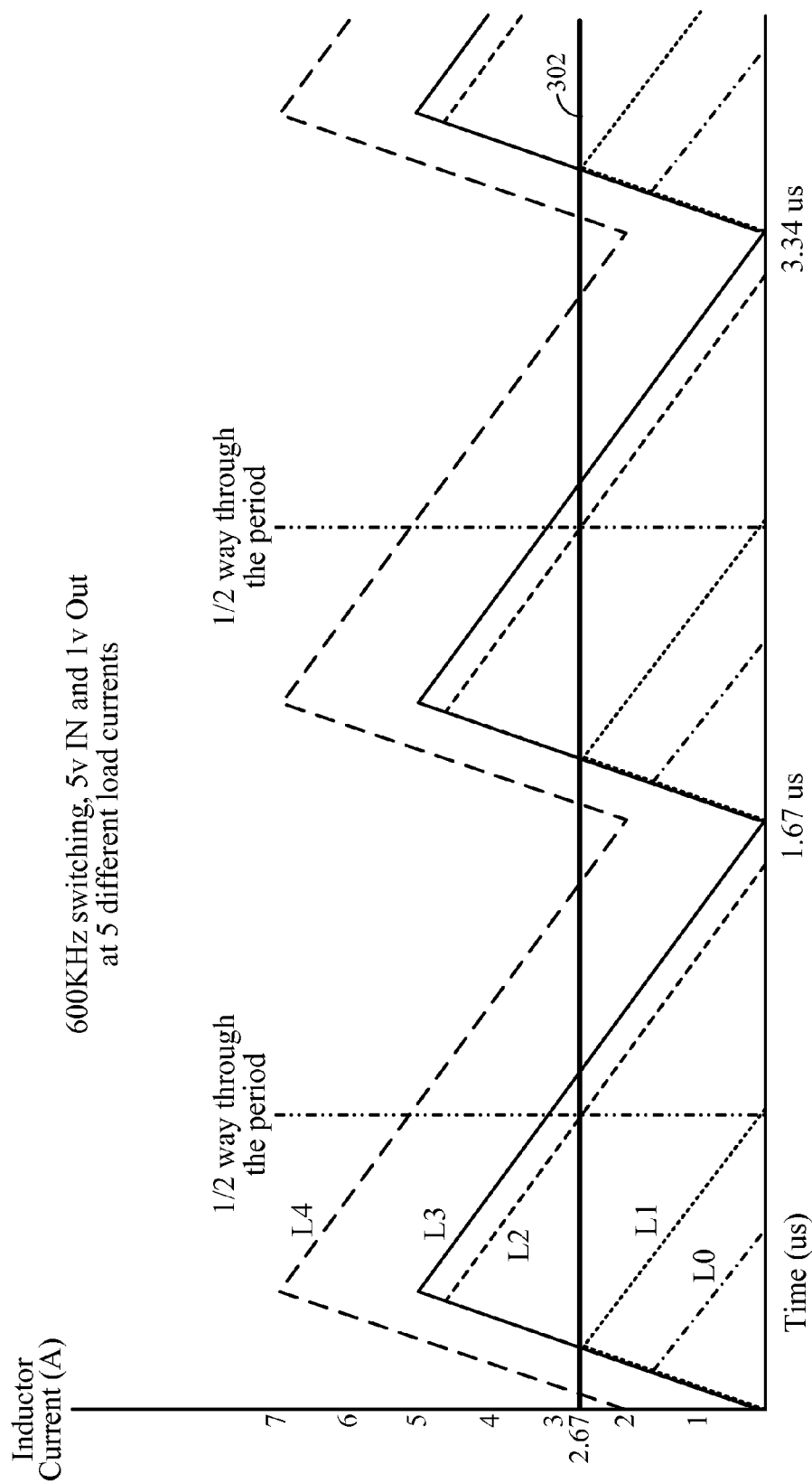
FIG. 3 shows an example of the inductor current according to one embodiment.

To illustrate the zero cross event, FIG. 3 shows an example of the inductor current according to one embodiment. The inductor, L, current is shown in FIG. 3 at several critical key current levels. The switching frequency is in this example is 600 kHz, (period=1.67 us). The system can operate in discontinuous mode (inductor current=0) at light load, and it can skip pulses at still lighter loads allowing the switching frequency to drop. The five inductor currents shown in the figure are L0, L1, L2, L3, and L4. L3 operates on the continuous/discontinuous boundary so that the inductor current falls to zero right before it rises again. L4 is continuous operation, so that the inductor current never falls to zero. L1 and L2 are discontinuous. L0 is discontinuous and also the inductor current hits 0 before the halfway point. In FIG. 1, the intersection of the shed and unshed operation efficiency happens at 2.67 amps, and that is the horizontal line at 302 in FIG. 3. The system load equals the average inductor current. So when the average of any of the waveforms is greater than 2.67 amps, the system should operate in unshed mode. When the average is below 2.67 amps the system operates in shed mode. For the figure L0, L1, and L2 averages are below the threshold and L4 is above. L3 average is slightly lower than the threshold. L0 and L1 show why shed signal generator circuit 208 also requires the zero cross information. At these inductor currents the low side MOSFET may be turned off due to zero cross at the time when the shed_comp signal is sampled by shed signal generator circuit 208.

Shed comparator 210, which measures the voltage across the low-side NMOS transistor, may be clocked around the ½ way point in time of the clock cycle by the ripple counters in shed signal generator circuit 208, but other times may be used. Another embodiment may include an active clocking time to always clock halfway through the NMOS on-time, which is useful to maintain a constant average current level as the converter duty cycle changes. After an arbitrary number of counts indicating that converter 200 should change state from shed to unshed or unshed to shed, shed signal generator circuit 208 changes the value of the shed signal. In FIG. 3, L4 and L3 would always cause the shed comparator 210 output to be low indicating that the system should operate in unshed mode. L2 is located in the transition zone, so depending on the shed comparator offset, it could either be high or low. Any current between L2 and L0, would cause the shed comparator 210 output to be high indicating that converter 200 should operate in shed mode. All currents that are less than L1 may be problematic (e.g., L0), because the low-side NMOS transistor turns off at zero cross. So when the output of shed comparator 210 is clocked, the low-side NMOS transistor is off so the drain to source voltage vds of the low-side NMOS transistor cannot be used to measure current. Thus, in particular embodiments, logic is included that detects a zero cross event before the ½ way point and tells converter 200 to shed. With the inclusion of this logic, all currents that are less than L1 will indicate that converter 200 should be shed.

Figure 4:
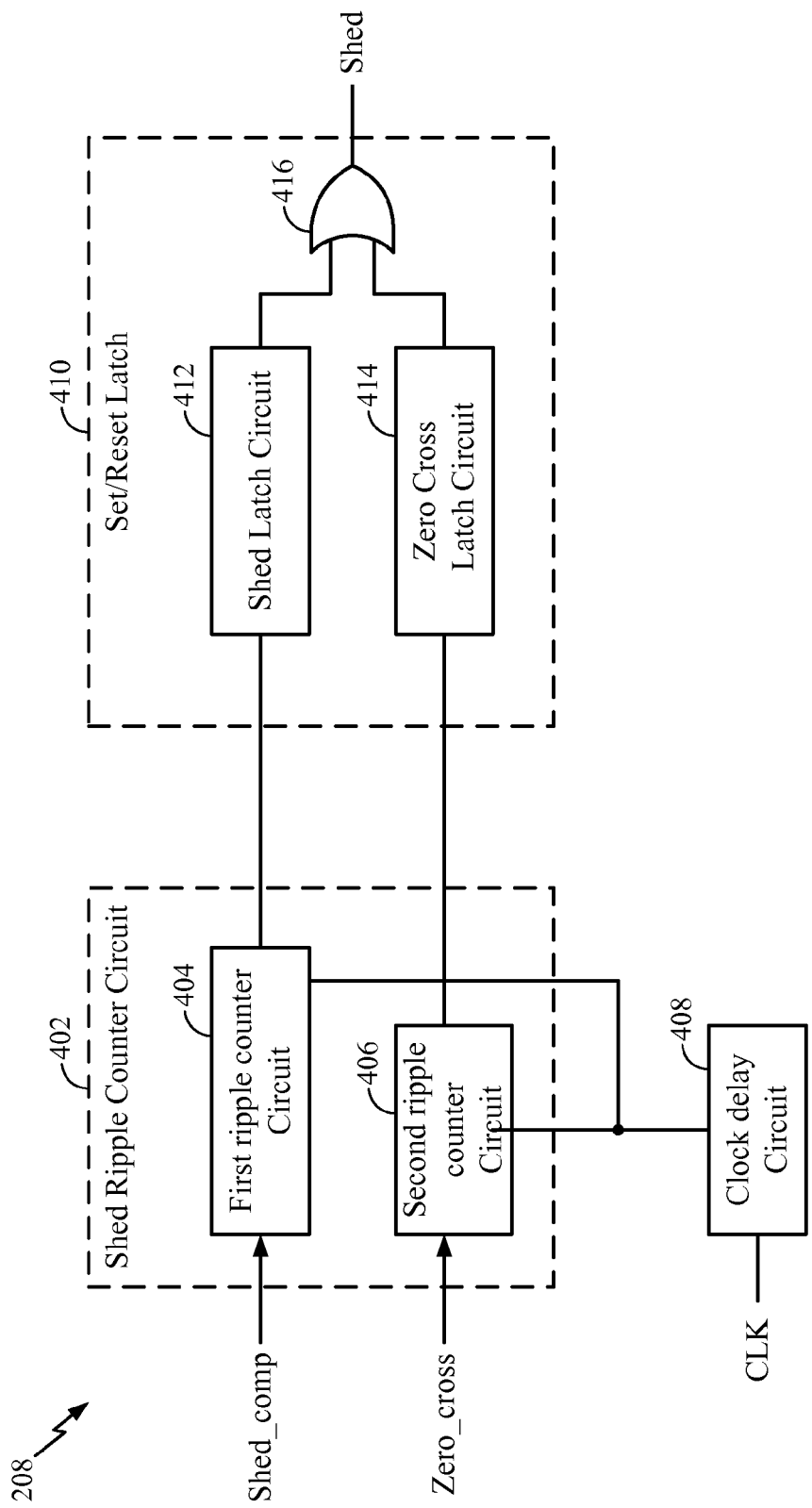
FIG. 4 depicts a more detailed example of a shed signal generator circuit according to one embodiment.

FIG. 4 depicts a more detailed example of shed signal generator circuit 208 according to one embodiment. A shed ripple counter circuit 402 receives the shed comparison signal shed_comp and the zero cross signal zero_cross. A first ripple counter circuit 404 samples the shed comparison signal and a second ripple counter circuit 406 samples the zero cross signal. In one embodiment, first ripple counter circuit 404 and second ripple counter circuit 406 may include logic that compares the state of the ripple counter registers and the sets or resets a reset/set (RS) latch only when all register values are equal. The ripple counters are clocked by a clock delay circuit 408 that receives a clock signal CLK and may be set at a frequency higher or lower than the converter switching frequency, such as at the half-clock frequency for sampling ½ way through the period.

Shed signal generator circuit 208 thereby digitally filters the shed_comp and zx_cross signals by ensuring that the state is steady over multiple periods before any change of shed state is allowed. If any chatter is observed, the set reset latch will hold its current state. A set/reset latch 410 receives the delayed shed comparison signal and delayed zero cross signal and can output the shed signal. In one embodiment, set/reset latch 410 includes a shed latch circuit 412 and a zero cross latch circuit 414. Shed latch circuit 412 may toggle the shed signal based on multiple outputs of flip-flops in first ripple counter circuit 404 all being the same and all indicating a change of shed state is needed. For example, if the outputs of three consecutive flip-flops have the same level from first ripple counter circuit 404, then shed latch circuit 412 may toggle the output of the shed signal. Zero cross latch circuit 414 may also determine if the output of a number of flip-flops in second ripple counter circuit 406 have the same level. In one embodiment, the number of flip-flops needed for toggling the zero cross signal may be less than the number of outputs needed to toggle the shed signal. For example, two consecutive flip-flops having the same level for the zero cross signal may be required to toggle the shed signal. This is because if a zero cross occurs, particular embodiments want to shed at a faster rate than if the shed comparison signal changes state. This is because when the inductor current goes to zero, voltage converter 200 needs to move to a shed state. Logic 416, such as a NOR gate, receives the output of shed latch circuit 412 and the output of zero cross so that both paths can force the voltage converter 200 to shed.

Figure 5A:
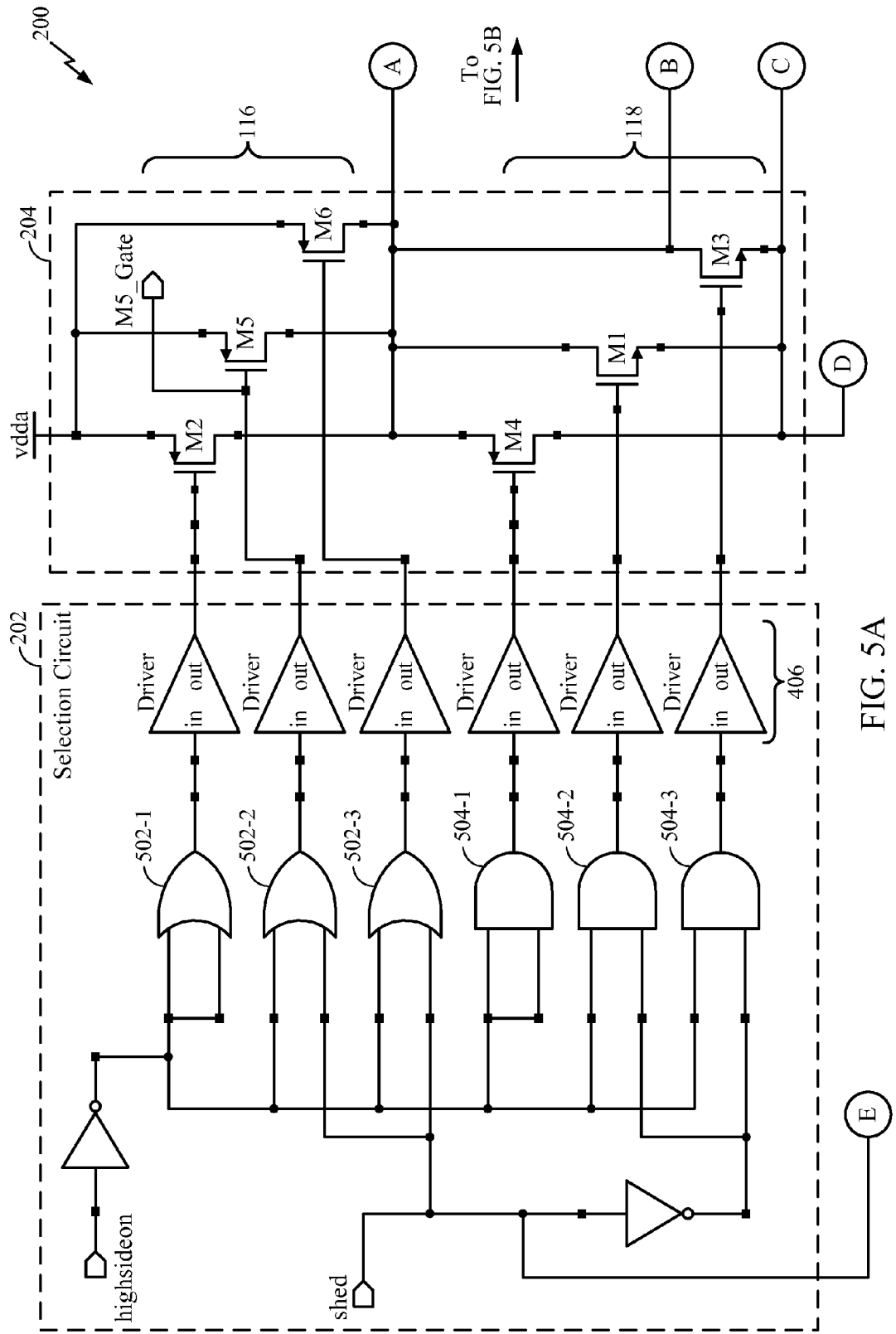
FIGS. 5A and 5B depict a more detailed example of voltage converter according to one embodiment.
Figure 5B:
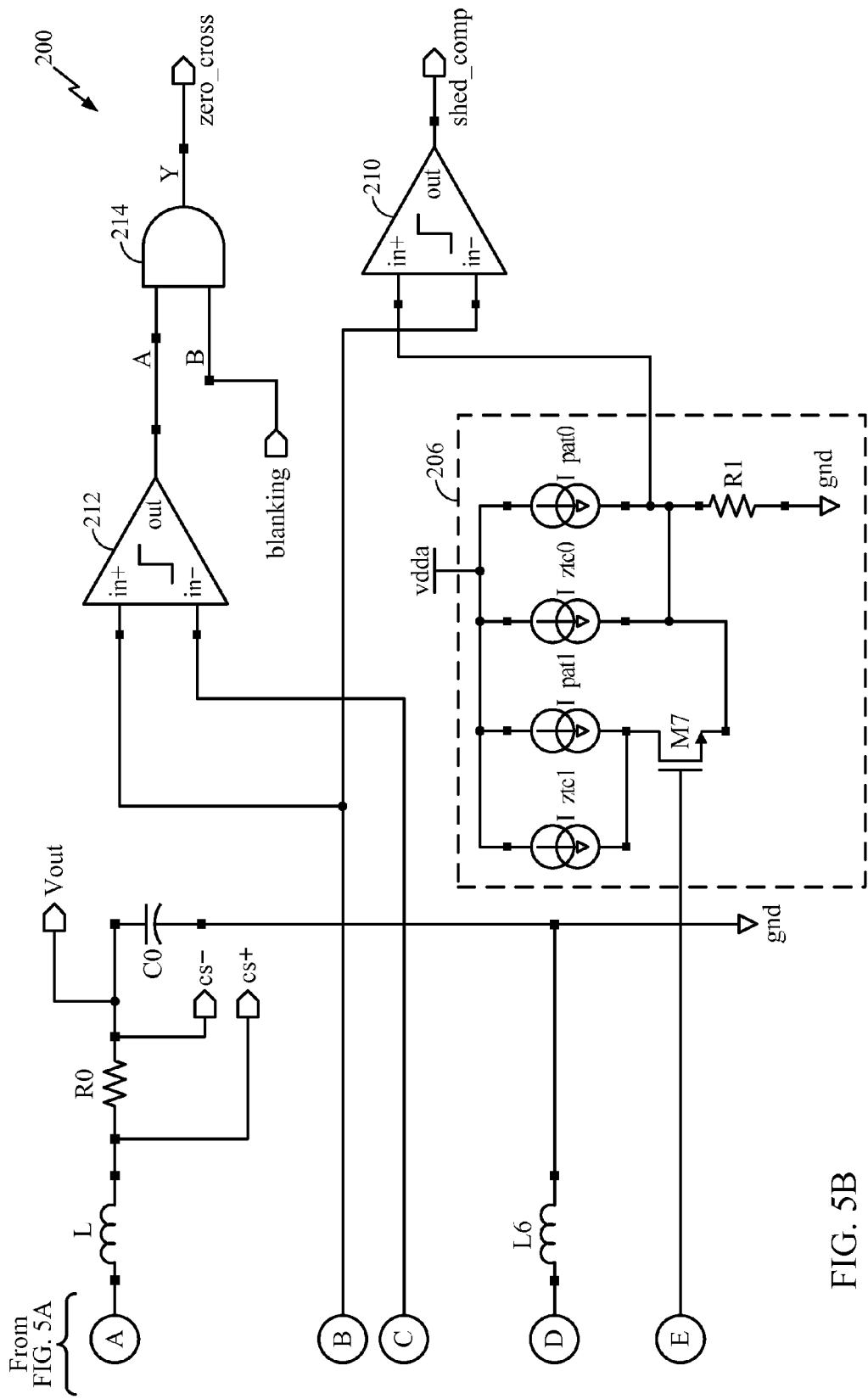

Voltage converter 200 will now be described in more detail. It will be understood that variations in the logic used will be appreciated. FIGS. 5A and 5B depict a more detailed example of voltage converter 200 according to one embodiment. Selection circuit 202 receives the highsideon(Q) signal and the shed signal.

The selection circuit 202 includes logic that can select which of the MOSFETs M1-M5 are turned on and off in switching circuit 204. In one embodiment, the shed signal is input into NOR gates 502-2 and 502-3 and also inverted and input into AND gates 504-2 and 504-3. Further, the highsideon(Q) signal is inverted and input into NOR gates 502-1, 502-2, 502-3, and AND gates 504-1, 504-2, and 504-3. For NOR gate 502-1 and AND gate 504-1, the highsideon(Q) signal is input into both inputs of the respective gate. Although these connections are shown, other logic may be used to select which of the MOSFETS are turned on and off. The NOR gates 502 and AND gates 504 are then output into driver circuits 506. Each driver circuit drives a gate of a different MOSFET in switching circuit 204. Based on the highsideon(Q) signal and the shed signal, the gate voltages of the MOSFETs in switching circuit 204 are driven to turn off and turn on the respective MOSFETs.

When the shed signal is high, switching circuit 204 turns off MOSFETs M5, M6, M1, and M3. When the shed signal is low, all six MOSFETs are controlled by the highsideon(Q) signal. When the highsideon(Q) signal is a first value, such as high, the high side PMOS devices are on, and when the highsideon(Q) signal is a second value, such as low, the three low-side NMOS devices are on. That is, the highsideon (Q) signal indicates that the high-side FETs 216 should be on when high (e.g., when there is a lower load current) and the low-side FETs 218 should be on when low (e.g., where there is a higher load current).

To detect whether the load current is above or below the shed threshold, several options may be used. The sense resistor R0 could be used but its very presence may hurt efficiency (see FIG. 5B). So if the resistor R0 is not needed it is better to sense either the voltage across the high side FETS 116 when they are on, or to detect the voltage across the low-side FETS 118 when they are on. Both may have the problem that the voltage across the MOSFETS will be 3 times larger when shed (assuming ⅔ of the MOSFET is shut down when shed). So the sensing mechanism must compensate for this change. The high side MOSFET has the added complication that in many buck converters for high power microprocessors the duty cycle is small and the actual on time of the high side MOSFET is too short to make a precise measurement of load current. The low-side N-MOSFET has the added complications that if a zero cross is detected, the NMOS transistor is turned off and the NMOS transistor is useless as a current sense element when it is off. Particular embodiments use the low-side NMOS transistor as the shed detect sense element in a system that turns the NMOS transistor off when it detects zero cross.

FIG. 3 represents a steady state, constant load. In a system with a constant load, taking the average of the inductor current by applying a low pass filter and comparing it to the 2.67 amps would be a way to determine whether the system should operate in shed or unshed mode. But in most real systems, the load varies. In a buck converter that powers a microprocessor, the load can change from ~2 amps to 20 amps in a few micro-seconds. It can then drop back to 2 amps. Any kind of filtering creates a phase delay, causing the system to be in shed mode when it should be in unshed mode. For example, if the load jumps in a square wave whose minimum is 2 amps and whose maximum is 15 amps and whose frequency is 10 kHz. If a single pole 6 kHz filter is used to average the inductor waveforms, the ripple will be reduced by 40 db. And the 5 amps of ripple will be reduced to 50 ma. But the delay caused by the filter can make it so that the system is shed at high current, and in unshed mode at low current. Thus, a sampled system may be preferred to a filtered one. Nevertheless it should be noted that the anti-chatter filter in shed ripple counter circuit 402 also adds a delay. But the delay is shorter and can be eliminated by minimizing the anti-chatter filtering if so desired or required.

FIGS. 5A and 5B show how to compensate for these changes in RDSON according to one embodiment. Reference voltage generator 206 is a mixture of proportional-to-absolute temperature (PTAT) current and zero temperature coefficient (ZTC). Its temperature coefficient (TC) is such that when it is used to create a reference voltage across resistor R1, the reference voltage has nearly the same (TC) and the NMOS power FET. With the addition of transistor M7, the current through the resistor R1 can be increased when shed. So if for example ⅔ of the FETs are shed, tripling the current through resistor R1 by turning on transistor M7 will keep the shed threshold constant independent of shed state.

In this example, ⅔ of the MOSFETs of switching circuit 204 are shed at light load. Other ratios are possible, and the optimal depends on the process, the MOSFET size, and the frequency. One complication is the sensing elements (e.g., the low-side MOSFETS, M4, M1 and M3) change with the mode. In unshed operation, the RDSON of these three MOSFETS is ⅓ that of the RDSON when only transistor M4 is on. The RDSON of the low-side MOSFETs also changes with temperature.

First, the RDSON of MOSFETs increases with temperature. In FIGS. 5A and 5B, current sources that do not change with temperature, I_ztc0 and L_ztc1, are added to ones that increase with temperature, I_ptat0 and I_ptat1. A transistor M7 is also coupled to current sources I_ztc0 and I_pat1 and turned on based on the shed signal. The current sources drive the resistor, R1. The voltage across resistor R1 is thus a function of the composite temperature coefficient of the two current sources and the temperature coefficient of resistor R1. The current sources may be readily available on most integrated circuits. Generally, current source I_ptat is generated from the bandgap reference and current source I_ztc will be taken from the bias of the chip implementing converter 200. The two current sources can be mixed in the desired ratio so that the voltage across resistor R1 changes with temperature at the same rate as the MOSFETS M1, M3 and M4. For example, if the RDSON increases by 50% from 0 to 125 degrees C., then the voltage across resistor R1 tracks this change. Those skilled in the art will appreciate that resistor R1 could be a small or stacked NMOS array and all of the ptat currents can be replaced with ztc sources. This would achieve the same goal.

When in shed mode, only transistor M4 is on, and the effective RDSON of the low-side MOSFET increases by a factor of 3. The voltage across resistor R1 will track this change if the current is increased by a factor of 3. In this example, 2 ua jumps to 6 ua. Alternatively, with the addition of 2 switches and a 15 k resistor it would be possible change resistor R1 from 5 k to 15 k and achieve the same results. For the circuitry to function properly, the same current in the low-side MOSFETS or MOSFET cause shed comparator 210 to change states. In this example, assume the MOSFET RDSON of transistors M1, M3 and M4 is 7.5 mohms. When transistors M1, M3 and M4 are all on, the effective RDSON is the parallel combination, 2.5 mohms. When in shed mode, the voltage across resistor R1 is 20 mv. In unshed operation, the voltage is 6.66 mv. Thus, shed comparator 210 changes state at around 2.67 amps. If the current is greater than 2.67 amps, the shed comparison signal is low, else it is high. From FIG. 3, during the time that the low-side MOSFET is on (buck off time), the current can change due to inductor current ripple. Shed comparator 210 can be clocked at any time during the buck off time as long as the shed threshold is adjusted for maximum efficiency (in this example, it is 2.667 load per FIG. 3). In this embodiment, shed comparator 210 will be clocked at ½ way through the cycle. As can be seen in FIG. 3, this may create a slight error, the L2 average current is clearly less than 2.67 amps but L2 corresponds to the shed/unshed transition. Any currents above L2 results in shed comparator 210 being low. This error is compensated by trimming resistor R1.

If the duty cycle changes in converter 200, the inductor current at the ½ way point through the period will change even if the load is the same. For example, if the output voltage is changed, the inductor current at the ½ way through the period time will change. So this technique works in applications where the duty cycle is limited. The resistor R1 value is set for the typical duty cycle and the best efficiency may be recorded only at the duty cycle. For applications with large duty cycle changes, an active clock that is dependent on the converter duty cycle may be needed.

Figure 6A:
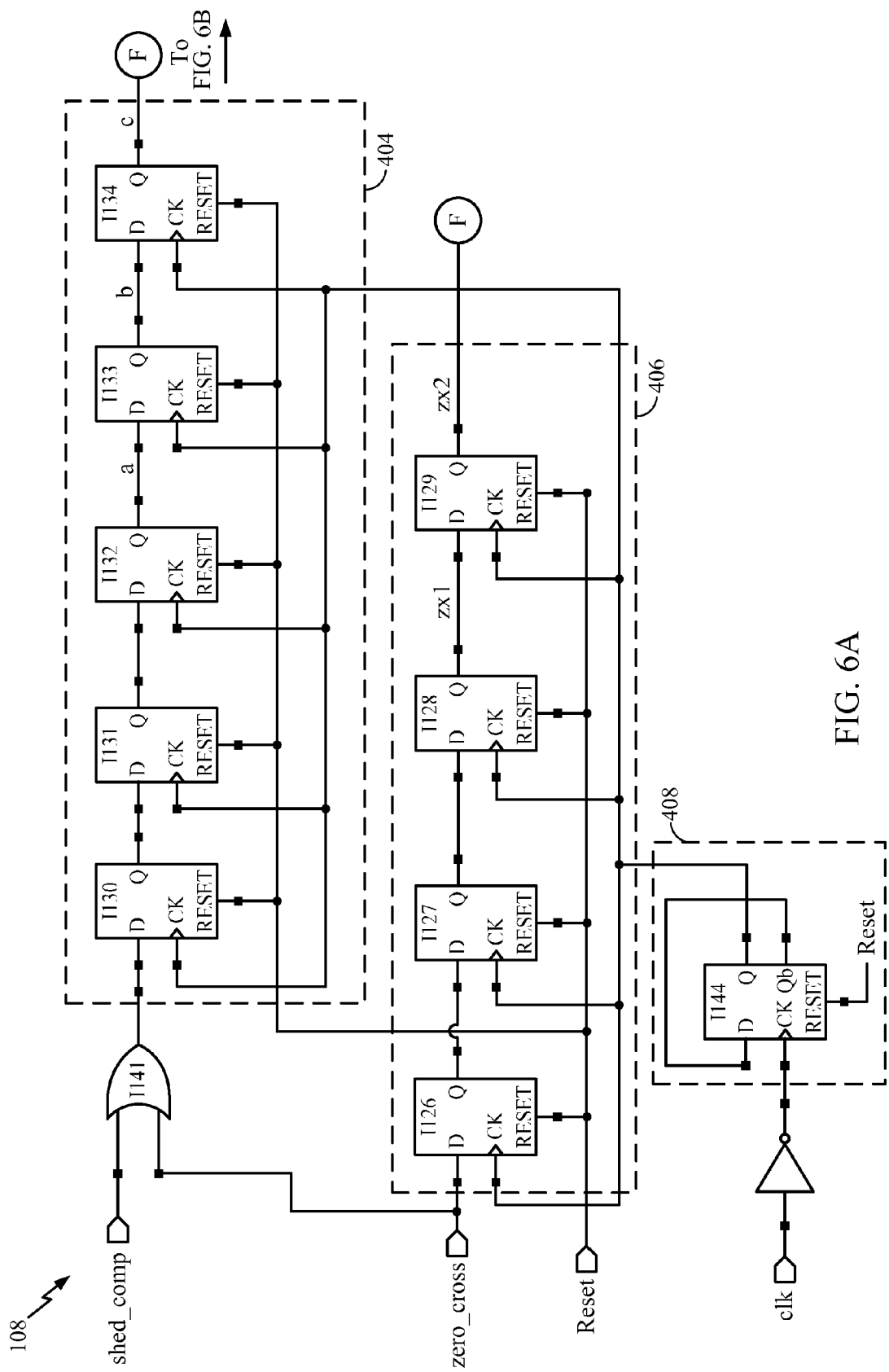
FIGS. 6A and 6B depict a more detailed example of the shed signal generator circuit according to one embodiment.
Figure 6B:
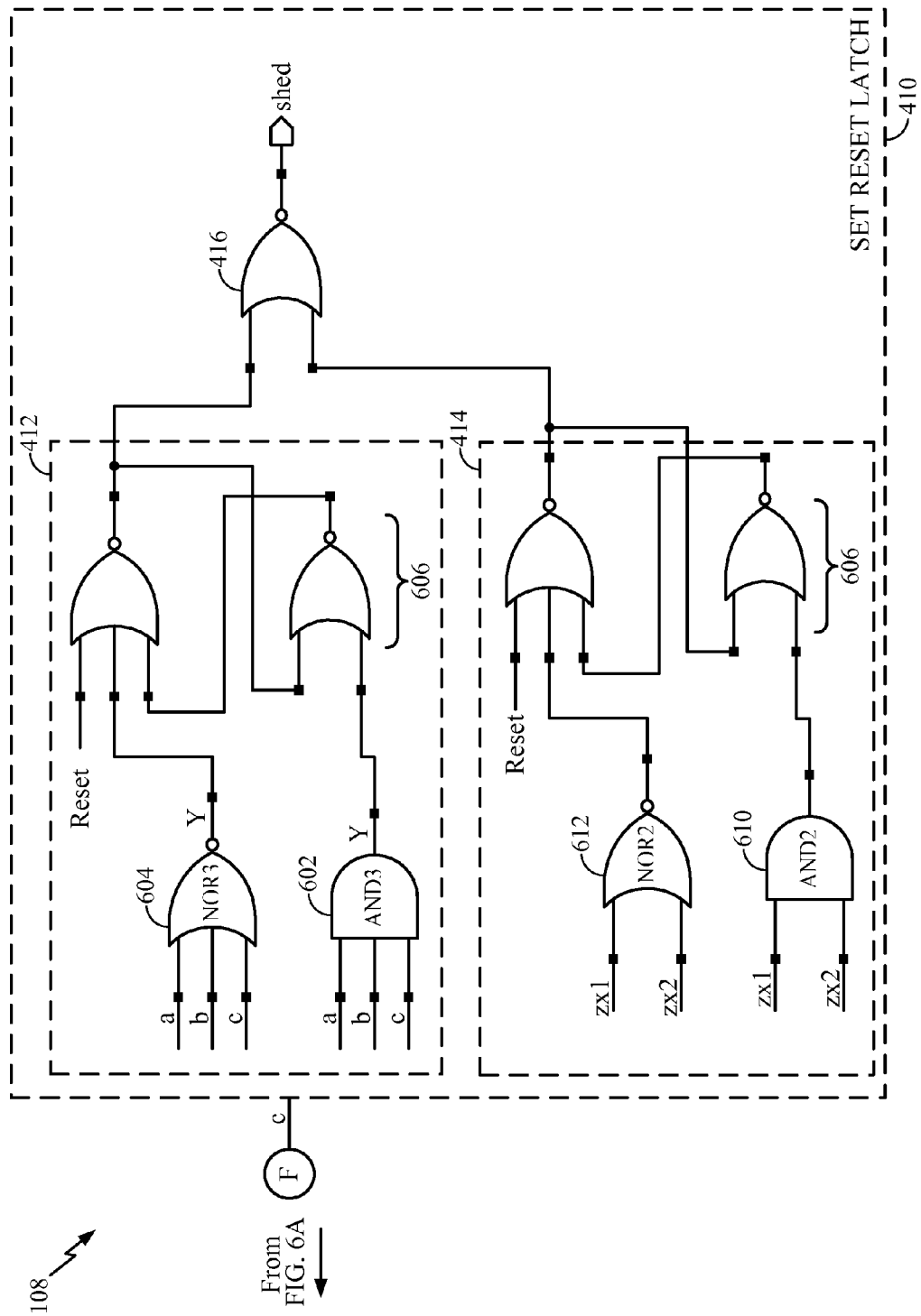

The processing of the shed comparison signal will now be discussed in more detail. FIGS. 6A and 6B depict a more detailed example of shed signal generator circuit 108 according to one embodiment. Although the logic is described in FIGS. 6A and 6B, it will be understood that variations of the logic may be appreciated to implement the clock, the delays, and the set-reset latch.

In FIGS. 6A and 6B, the clock clk is the signal that turns on the high side MOSFET. It signals the beginning of a switching cycle. It is inverted at inverter 601 and divided down with a flip flop 1144. The Q output of flip flop 1144 toggles at ½ way though the clock period every other switching cycle. This new clock is used to clock the output of both shed comparator 210 and zero cross comparator 212 in FIGS. 5A and 5B. The effect is to sample each comparator ½ way through the period every other switching cycle.

In set/reset latch 410, shed latch circuit 412 receives the outputs a, b, and c and tests whether all three of the outputs are the same value. If so, the shed output may be toggled through NOR gate 416. Also, zero cross latch circuit 414 receives outputs zx1 and zx2 and determines if the outputs are the same value. If so, zero cross latch circuit 414 may toggle the shed signal through NOR gate 416.

The ripple counter of flip flops 1130 to 1134 can only have its last three outputs labelled a, b, and c all high or all low if the clocked shed comparator 210 output (received through NOR gate 1141, which receives the shed comparison signal and the zero cross signal) is in the same state for 3 consecutive clocks (another number of clock cycles may also be used). These outputs are sent to the latch through two gates, an AND3 gate 602 and a NOR3 gate 604, so that the latch can detect that all three are either high or low. The latch+ logic combination 606 (e.g., shed latch circuit 412) will only change state when all three of its inputs a, b, and c are either high or low. Thus, if the shed comparator 210 changes state on a cycle by cycle basis the state of converter 200 will not change. The ripple counter logic 404 can be made arbitrarily long to prevent chatter from the shed mode to unshed mode, and vice-versa.

If the output of the shed comparator 210 is high, indicating a current less than the shed threshold and if it stays there for a few cycles, the shed output in FIGS. 6A and 6B will toggle high telling converter 200 to shed and shut off sections of the power MOSFETS. Also, if the output of the shed comparator 210 is low, indicating a current more than the shed threshold and if it stays there for a few cycles, the shed output in FIGS. 6A and 6B will toggle low telling converter 200 to unshed and turn on the turned off sections of the power MOSFETS.

In FIGS. 6A and 6B, the output of the zero cross comparator 108 is fed into the lower ripple counter circuit 406 including flip flops 1126-1129. Zero cross comparator 108 is also clocked at ½ way through the cycle. If a zero cross is detected before the ½ way point, the lower ripple counter is forced high. This path will count through and tell the system to shed so the lower ripple counter only exists to add flexibility. Its counts should be made shorter than the shed counter because systems that detect zero cross before the ½ way point are at very light load and should move to a shed state. With the addition of the lower ripple counter for outputs zx, the shed ripple counter can be made longer and the system can still respond and move to a shed state at a very light load.

The outputs zx1 and zx2 are sent to the latch through two gates, an AND2 gate 610 and a NOR2 gate 612, so that the latch can detect that both are either high or low. The latch+logic combination 606 (e.g., zero cross latch circuit 414) will only change state when both of its inputs zx1 and zx2 are either high or low. Thus, if zero cross comparator 212 changes state on a cycle by cycle basis the state of converter 200 will not change. The ripple counter circuit counter can be made arbitrarily long to prevent chatter from the shed mode to unshed mode operation and vice-versa, but is less than the ripple counter circuit counter for the shed comparison.

Particular embodiments provide an accurate/lossless way to detect the load current in a voltage converter using the MOSFET drain-source voltage or current when the MOSFET RDSON can change on the fly when sections of the MOSFET are shut down at light load to boost efficiency. Further, the detection circuit works with the zero cross circuit so that if the sensing element (low-side MOSFET) is shut off entirely, the circuit responds correctly. Lossless sensing is important because this technique can boost efficiency by 1 to 2% at medium/light loads, but this efficiency boost may be negated if the current sense element adds additional losses.

Particular embodiments also provide circuitry such that if the load goes from a light load to a heavy load, the move to an unshed state is performed quickly to turn on the MOSFETs in switching circuit 104. Particular embodiments provide when the load goes from a light load to a high load, if in shed, the high-side FETs 216 are kept on ignoring current limit for a fixed blanking time to ensure a good transient response in the output voltage. Also, when the transition between shed and unshed occurs, the PWM signal may get corrupted. Particular embodiments may blank the PWM signal for a delay until the corruption has passed.

Particular embodiments use a current limit signal ILimit to indicate whether to unshed based on the current in the high-side FETs 218. When the system goes from a light load to a large load, not allowing the voltage converter 200 to unshed during the large positive load step can create a situation where a small part of the MOSFETs is taking a full load current. This may damage the system. Thus, it is important to unshed very quickly when the load changes from a light load to a large load. The current limit signal normally turns off high-side FETs 216 and turns on low-side FETs 218 when in unshed state. However, particular embodiments use the current limit signal to determine when to unshed. That is, when the current limit signal goes above a threshold, particular embodiments use the current limit signal to unshed and turn on MOSFETS in switching circuit 204. Also, the current limit signal is blanked such that the highsideon(Q) signal is not changed to turn off the high-side FETs 216 and turn on the low-side FETs 218 for a certain period of time. The blanking allows the switching circuit 204 to unshed, which may then increase the current limit threshold, and the current limit may not violate the new current limit threshold once all MOSFETS sections are turned on.

Turning on/off sections of the MOSFETs in switching circuit 204 to optimize the efficiency curve, can significantly degrade the transient performance of the system. This is most problematic for current mode when the current ramp is generated from a replica that mirrors that the high side MOSFET current. Not allowing the part to unshed during a large positive load step can create a situation where a small part of the power MOSFETs are taking full load current. Allowing the part to unshed during the large positive load step, perturbs the ramp as additional replicas are switched in and the resulting glitch will cause a PWM comparator to turn off the high side MOSFET right when it needs to be on the most (during a positive load step). Charge shedding can corrupt any signal that depends on the FET RDSON. This corruption can create transient artifacts at shed state transitions of false current limit, false zero cross detection, and gain changes in the current ramp could cause the system to be unstable.

Figure 7:
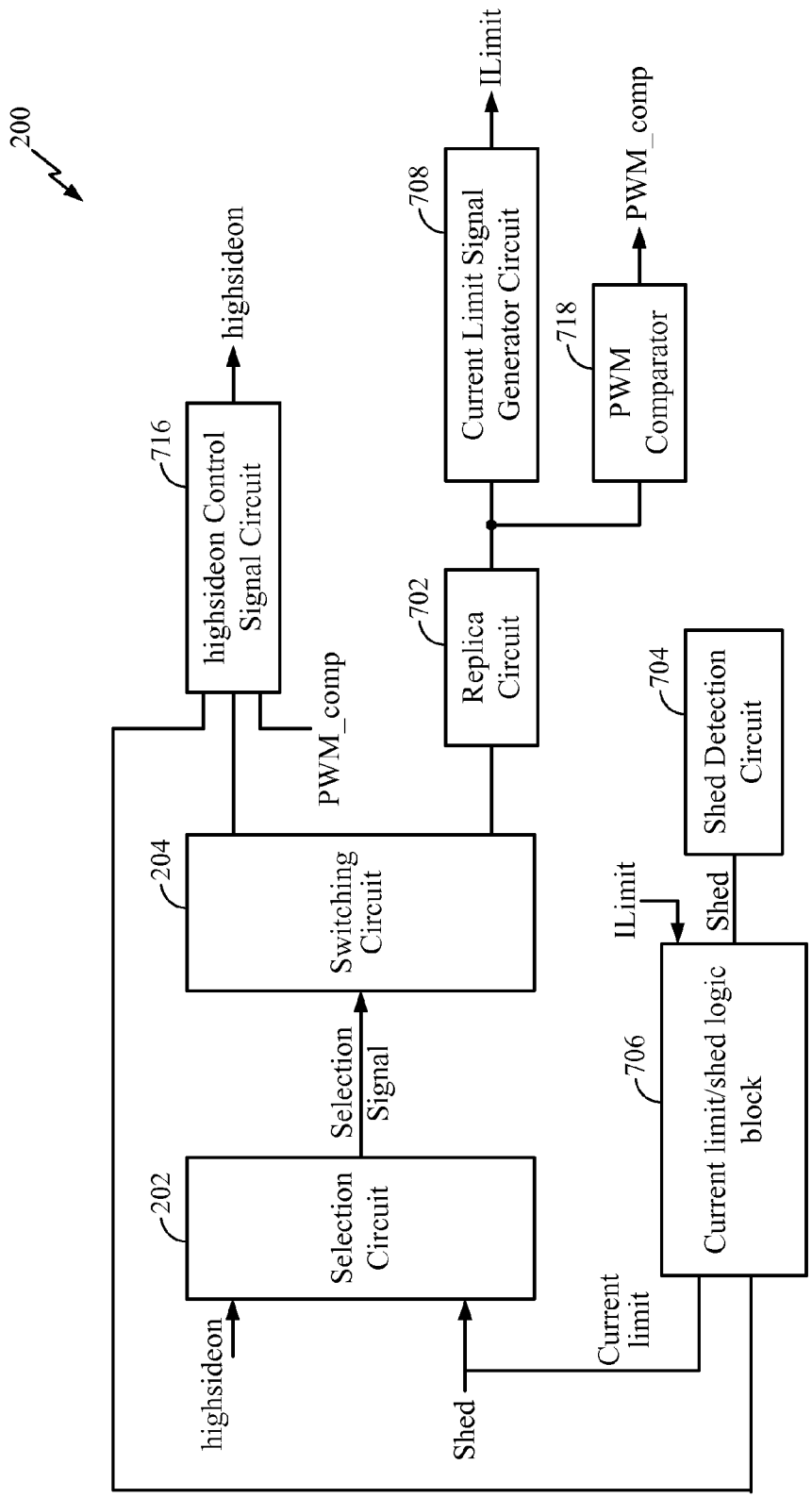
FIG. 7 depicts a simplified circuit of the voltage converter for processing a current limit signal according to one embodiment.

FIG. 7 depicts a simplified circuit of converter 200 for processing a current limit signal according to one embodiment. Shed detection circuit 704 may include reference voltage generator circuit 206, shed comparator 210, and shed signal generator circuit 208 from FIG. 2. Shed detection circuit 704 may generate a shed signal that is input into a current limit/shed logic block 706. Current limit/shed logic block 706 also receives the current limit signal ILimit.

The current limit signal may be generated via a replica circuit 702 and a first current limit signal generator circuit 708. Replica circuit 702 may be a replica of the PMOS devices in switching circuit 104. Current limit signal generator circuit 708 may detect the current through replica circuit 702 and output the current limit signal, which may go high when the detected current is above the current limit threshold. Replica circuit 702 is not adjusted for the shed/unshed state. So when in the shed state. the iLimit signal will be lower than when unshed. If ⅔ of the FETs are shed, the iLimit signal will be ⅓ of the nominal value when shed.

When the current limit signal indicates the current limit has been reached and converter 200 is in the shed state, current limit/shed logic block 706 outputs the unshed signal to the selection circuit 202. If the iLimit signal stays high for a fixed short time, current limit/shed logic block 706 then tells the high side FETs to turn off by sending a signal to highsideon control signal circuit 716. —Current limit/shed logic block 706 signals to highsideon control signal circuit 716 to immediately turn off if an iLimit is received in the unshed state.

When shed, because this current limit signal is delayed, switching circuit 204 has time to turn on the MOSFETs. When the MOSFETs are turned on, the current limit threshold in the unshed state is increased. For example, the current limit may be increased from 10 amps to 30 amps when the additional MOSFETs are turned on. This is because the additional number of MOSFETs in parallel increases the current limit threshold. Due to the delay, the current limit threshold may not be violated now with the new higher threshold. This delay may allow the high-side FETs 216 to be on when they need to be on to supply current to the load. After the delay, the current limit signal is allowed to propagate through to highsideon(Q) control signal circuit 716. However, now that converter 200 is in the unshed state, if the current limit event does occur, the highsideon(Q) would turn off the PMOS transistors and turn on the NMOS transistors of switching circuit 204.

Also, highsideon(Q) control signal circuit 716 receives the PWM signal PWM_comparison. During a shed to unshed transition, the current ramp will be perturbed in current mode control and the PWM signal will thus be perturbed as additional replicas are switched in and a resulting glitch causes the PWM comparator 718 to turn off the high-side FETs 216 during the positive load step. Highsideon(Q) control signal circuit 716 may be configured such that the PWM comparison signal cannot turn off the high-side FETs 216 for a fixed short delay following a change of shed state.

FIGS. 8A-8D depict a more detailed example of FIG. 7 according to one embodiment. Replica circuit 801 includes transistors M2REP, M5REP, and M6REP, which are replicas of high side FETs 216. First current limit signal generator circuit 708 includes another replica MOSFET M0, a comparator 809, and an AND gate—811, to generate the current limit signal. The current limit signal is not scaled with the shed to unshed signal. That is, the current in transistor M0 is the same whether the converter is shed or unshed. Also, PWM comparator 802, PWM_comp, is coupled to a replica current from replica circuit 801 through transistor M9 and also an error amplifier, error_amp 821. Error amplifier 821 receives a voltage reference VREF and the inductor current, and outputs a comp signal to PWM comparator 802. Transistor M9 is coupled to opamp 823, which forces the drain of the replicas to have the same voltage as the drain of the power. PWM comparison signal PWM_comp is output by PWM comparator 802. Also, PWM comparator 802, PWM_comp, has as its inputs the inductor based current ramp (M) and the output of the error amp (P). PWM comparison signal PWM_comp is output by PWM comparator 802 in order to turn off the high-side FETs 216. The high side FET turns on with the clock when latch 812 is set.

Highsideon control signal circuit 716 includes a delay circuit 805 that may delay the ILimit signal by 30 nanoseconds, or some other delay. Delay circuit 805 is a falling edge delay that triggers off of a shed PMOS sections gate going low (unshedding). Thus the signal from the iLimit comparator 809 is blanked for 30 ns after the system unsheds. This allows ample time for the new higher iLimit threshold and the iLimit comparator to go low. Thus, iLimit when shed is only a signal to unshed, it will not turn off the high side FETs. Current limit/shed logic block 706 includes inverter I1 and AND gate 810. And gate 810 connects to the selection circuit 202 in FIG. 7. When iLimit goes high, if shed, the selection circuit will immediately unshed. This bypasses all counters so the delay is minimal.

Figure 8A:
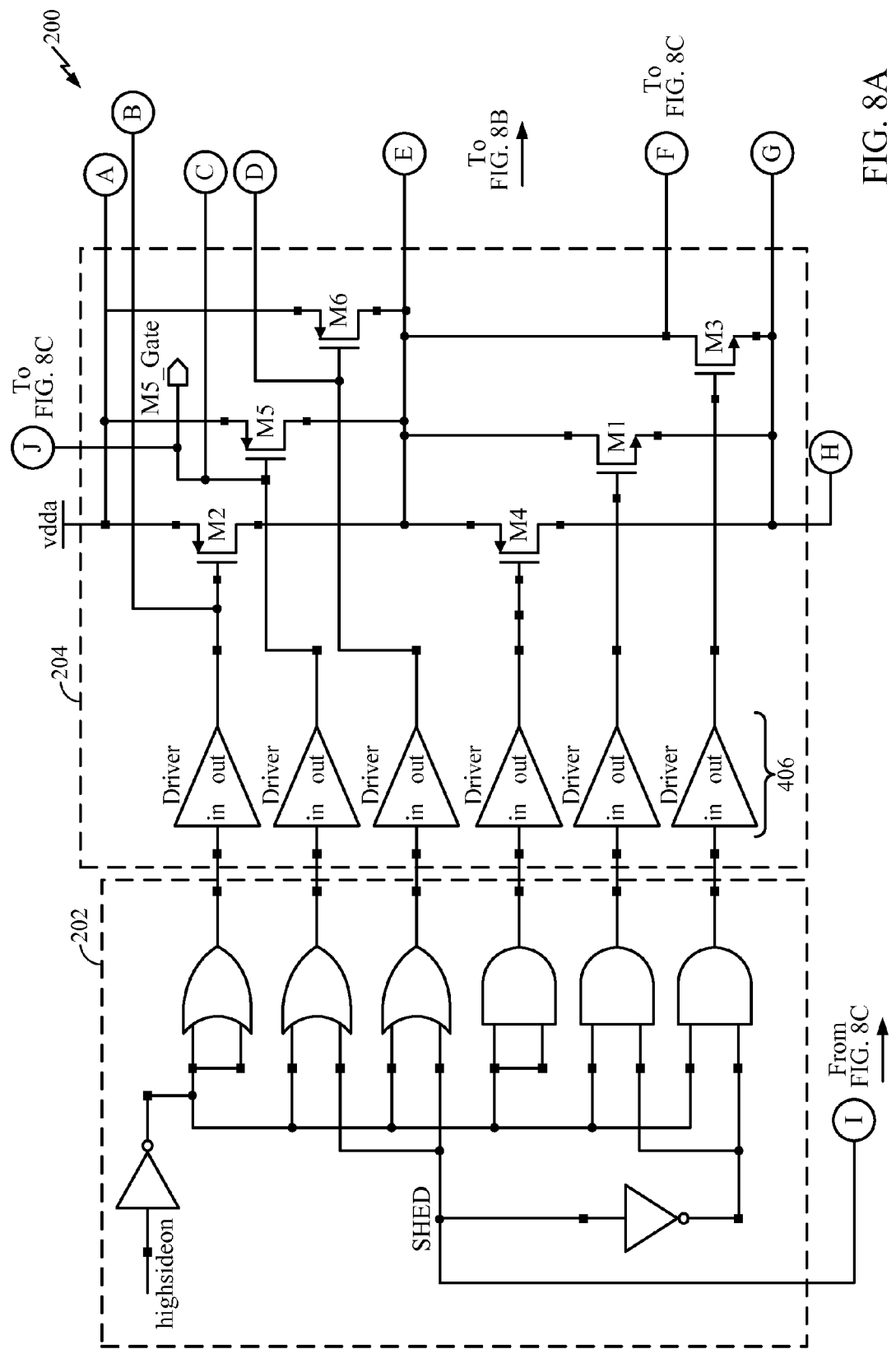
FIGS. 8A-8D depict a more detailed example of FIG. 7 according to one embodiment.
Figure 8B:
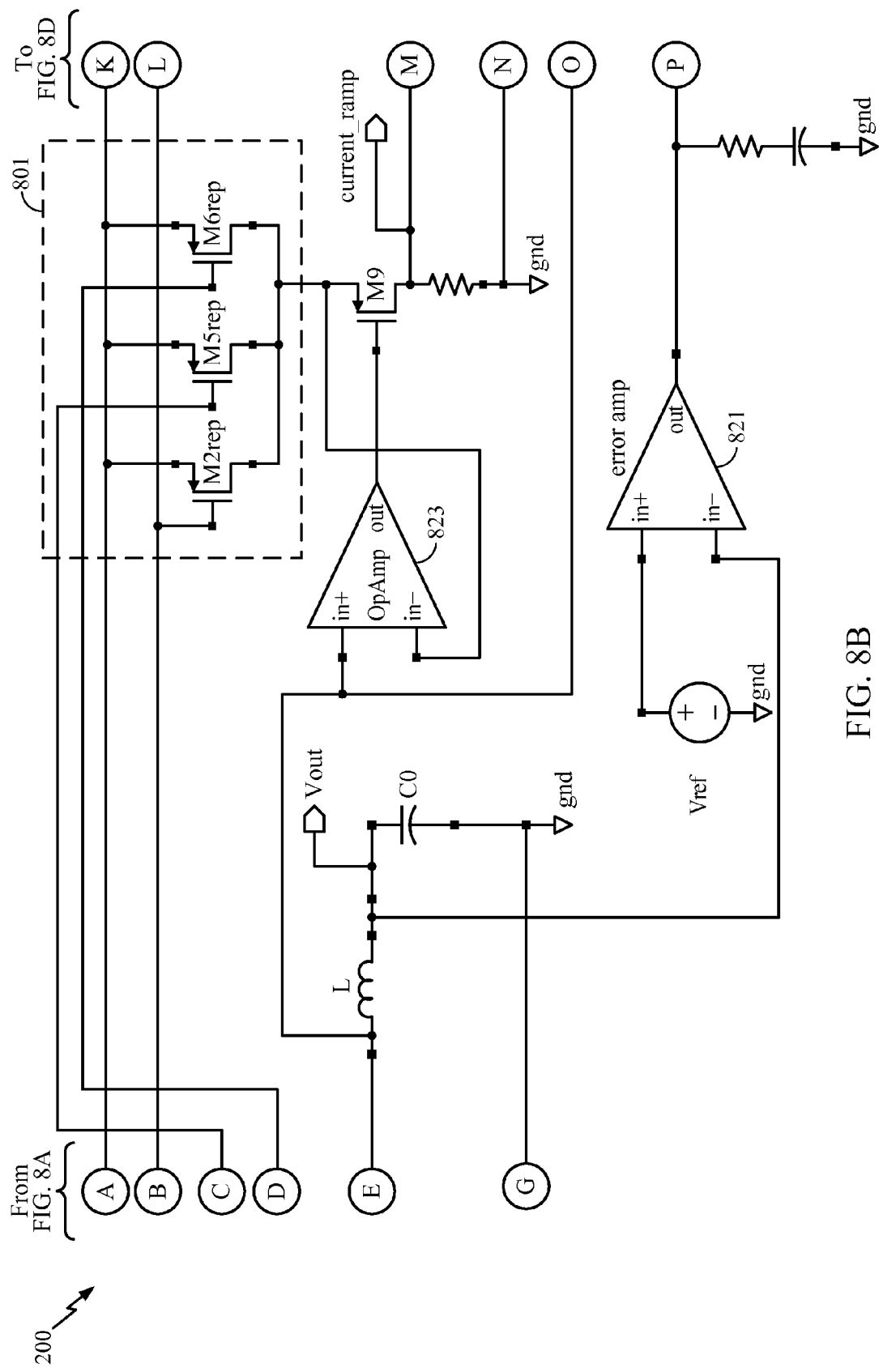
Figure 8C:
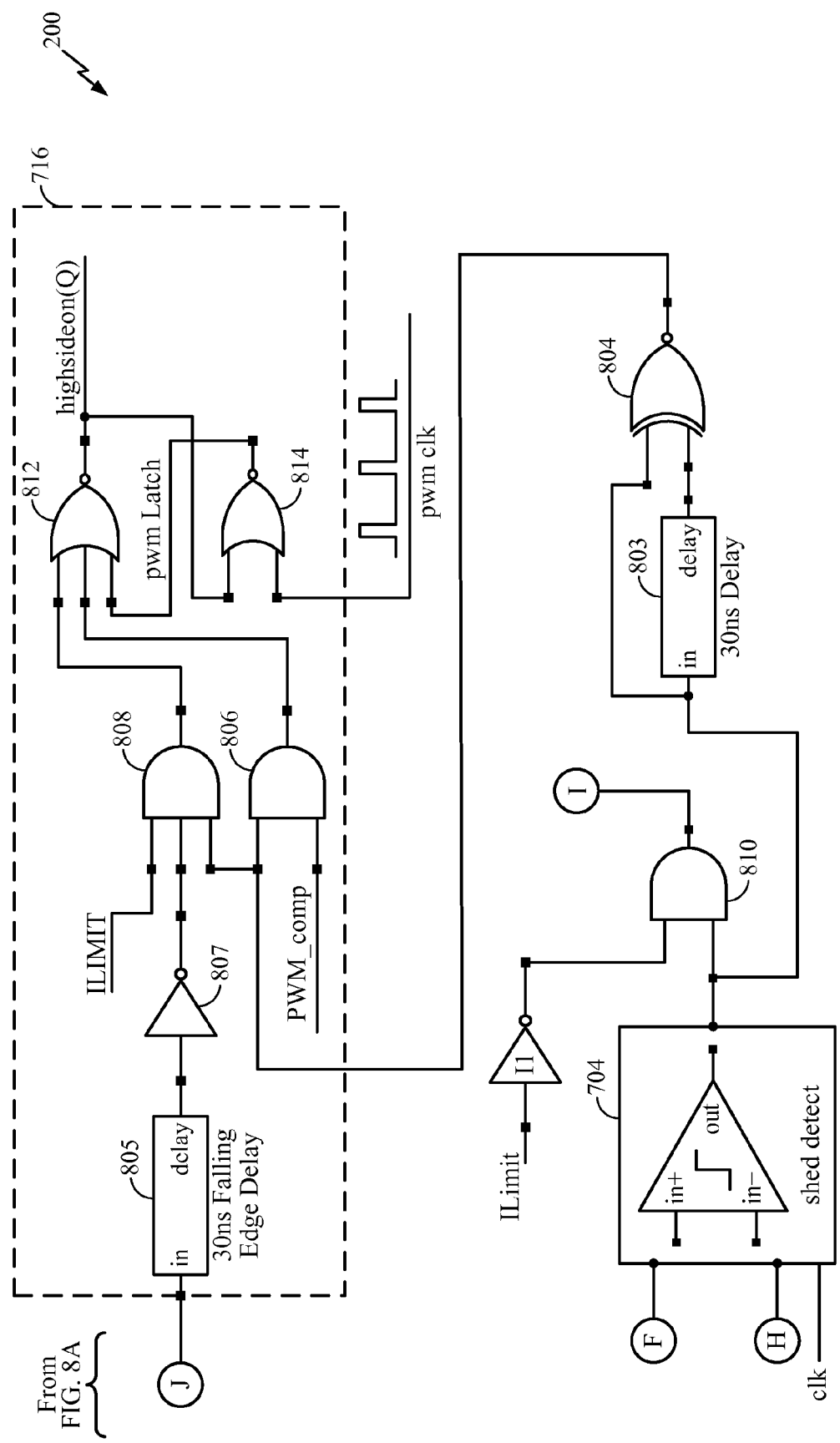
Figure 8D:
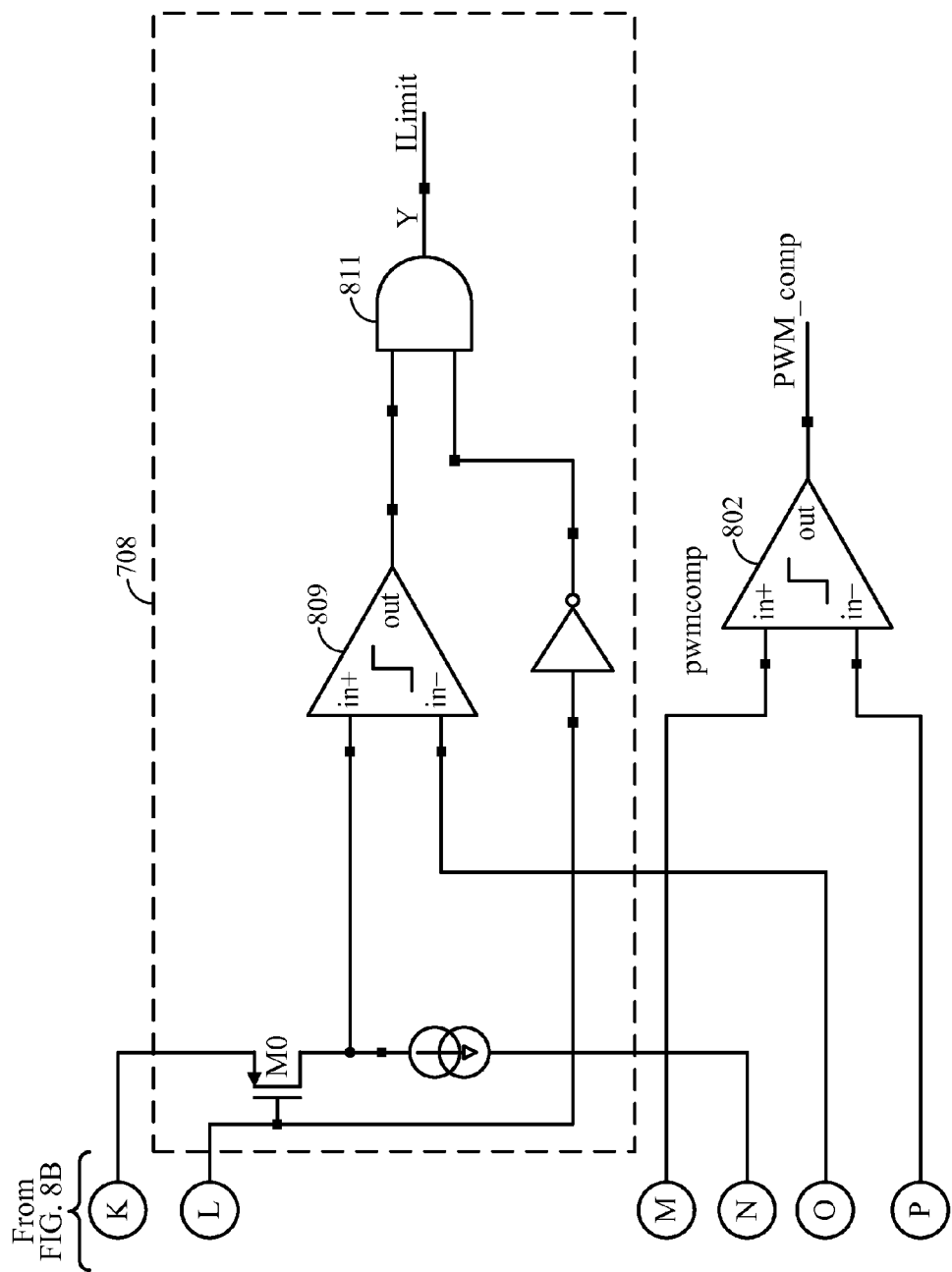

Because the current ramp is corrupted by shed or unshed operations it too must be blanked. In FIG. 8B, when shed, only one replica M2rep is on when shed. All replicas are on when not shed. Opamp 823 cannot respond instantly to switching in and out replicas so the current ramp will see large glitches at shed transitions. This will cause the pwm-comp 802 to misfire and turn the high side off when it should be on. The logic on the output of the shed detection circuit 704 prevents this from happening. At any state change in the shed detection circuit 704, the exclusive NOR gate 804 output will be low for the duration of the delay 30 ns in this case. Through the action of AND gate 806, the pwmcomp cannot rest the pwmlatch during this blanking time.

Particular embodiments allow the PMOS devices to stay on during the current limit and through the shed to unshed transition. This allows the inductor current to ramp to match the new higher load while increasing the size of the high-side FET. Also, when the unshed occurs, the PWM comparator is blanked so perturbations in the current ramp do not result in an early termination of an on-pulse that may turn off the high side PMOS devices.

Figure 9:
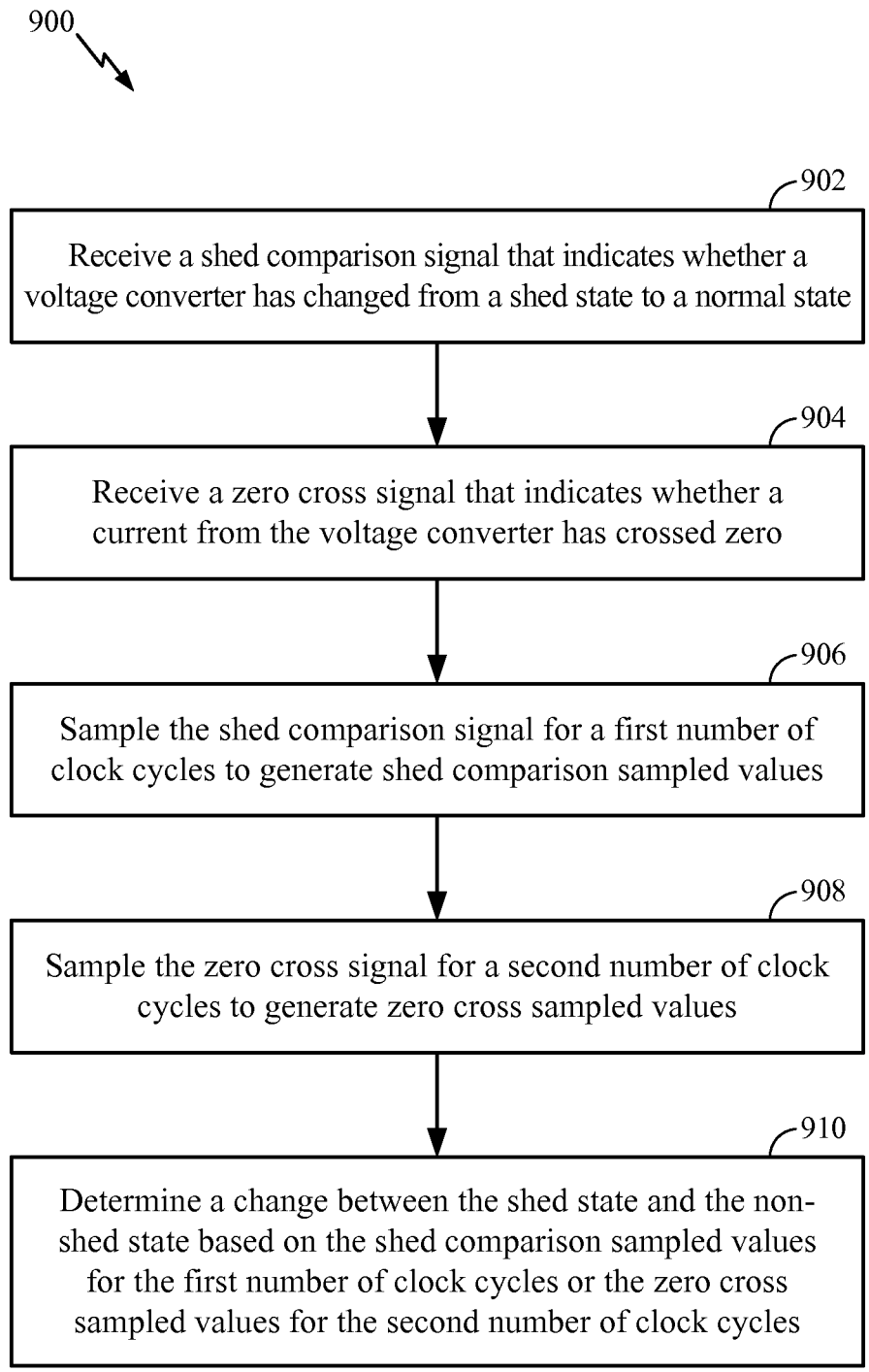
FIG. 9 depicts a simplified flowchart of a method for performing charge shedding for voltage converter according to one embodiment.

FIG. 9 depicts a simplified flowchart 900 of a method for performing charge shedding for voltage converter 200 according to one embodiment. At 902, shed signal generator circuit 208 receives a shed comparison signal that indicates whether a voltage converter has changed from a shed state to an unshed state. At 904, shed signal generator circuit 208 also receives a zero cross signal that indicates whether a current from the voltage converter has crossed zero. At 906, shed signal generator circuit 208 samples the shed comparison signal for a first number of clock cycles to generate shed comparison sampled values. At 908, shed signal generator circuit 208 also samples the zero cross signal for a second number of clock cycles to generate zero cross sampled values, wherein the second number of clock cycles are less than the first number of clock cycles. At 910, shed signal generator circuit 208 determines a change between the shed state and the unshed state based on the shed comparison sampled values for the first number of clock cycles or the zero cross sampled values for the second number of clock cycles.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A voltage converter comprising:
a switching logic including a plurality of transistors, wherein a portion of the plurality of transistors are configured to be switched on and off when the voltage converter changes between a shed state and an unshed state;
a first comparison logic configured to compare a voltage from the voltage converter to a reference voltage, the first comparison logic configured to generate a shed comparison signal based on a comparison of the voltage from the voltage converter to the reference voltage;
a second comparison logic configured to determine whether a current from the voltage converter has crossed zero and generate a zero cross signal that indicates the current from the voltage converter has crossed zero;
a first ripple counter logic configured to sample the shed comparison signal for a first number of clock cycles to generate shed comparison sampled values;
a second ripple counter logic configured to sample the zero cross signal for a second number of clock cycles to generate zero cross sampled values, wherein the second number of clock cycles are less than the first number of clock cycles; and
a shed signal logic configured to determine a change between the shed state and the unshed state corresponding to the portion of the plurality of transistors based on monitoring the shed comparison sampled values for the first number of clock cycles and the zero cross sampled values for the second number of clock cycles to determine either the shed comparison sampled values have essentially a first same value or the zero cross sampled values have essentially a second same value.

2. The voltage converter of claim 1, further comprising:
a selection logic configured to turn on or turn off the portion of the plurality of transistors based on a shed signal generated by the shed signal logic indicating the change between the shed state and the unshed state.

3. The voltage converter of claim 1, wherein:
the plurality of transistors includes a first set of high side transistors of a first type and a second set of low side transistors of a second type,
wherein the first comparison logic is coupled to a transistor in the second set of low side transistors, and
wherein the voltage from the voltage converter is a voltage across the transistor in the second set of low side transistors.

4. The voltage converter of claim 1, wherein:
the first ripple counter logic comprises a first counter including a first delay, and
the second ripple counter logic comprises a second counter including a second delay shorter than the first delay.

5. The voltage converter of claim 1, wherein the shed signal logic comprises:
a set-reset latch configured to determine the change between the shed state and the unshed state based on determining the shed comparison sampled values are essentially the first same value for the first number of clock cycles or determining the zero cross sampled values are essentially the second same value for the second number of clock cycles.

6. The voltage converter of claim 1, further comprising:
a first current limit logic configured to generate a current limit signal when a current limit is detected in the voltage converter, wherein the current limit is detected when the current goes above a current limit threshold; and
a second current limit logic configured to use the current limit signal to change the voltage converter from the shed state to the unshed state.

7. The voltage converter of claim 6, further comprising:
a blanking logic configured to blank the current limit signal for a time delay after the current limit signal changes the voltage converter from the shed state to the unshed state.

8. The voltage converter of claim 7, wherein the blanking logic uses a delayed voltage from a transistor in the plurality of transistors to perform the blanking.

9. The voltage converter of claim 6, further comprising:
a pulse width modulation (PWM) logic configured to blank a PWM comparison signal that is configured to turn off high side transistors from the plurality of transistors, the PWM logic using the current limit signal to blank the PWM comparison signal for a time delay while the voltage converter changes between the shed state and the unshed state.

10. The voltage converter of claim 1, wherein:
the switching logic includes a first set of high side transistors and a second set of low side transistors,
the first comparison logic includes a first comparator coupled to a transistor in the second set of low side transistors configured to compare a voltage across the transistor to the reference voltage, the comparator configured to generate the shed comparison signal that indicates whether the voltage across the transistor has crossed the reference voltage,
the second comparison logic includes a second comparator configured to determine whether the current from the transistor has crossed zero and to generate the zero cross signal that indicates the current has crossed zero,
the first ripple counter logic includes a first counter configured to sample the shed comparison signal for the first number of clock cycles to generate the shed comparison sampled values,
the second ripple counter logic includes a second counter configured to sample the zero cross signal for the second number of clock cycles to generate the zero cross sampled values, and
the shed signal logic includes a set-reset latch configured to determine the change between the shed state and the unshed state based on the shed comparison sampled values for the first number of clock cycles or based on the zero cross sampled values for the second number of clock cycles.

11. The voltage converter of claim 10, further comprising:
a reference generator logic configured to adjust the reference voltage for temperature changes.

12. A method comprising:
generating, by a voltage converter, a shed comparison signal that is based on a comparison of a voltage detected from a voltage converter to a reference voltage;
generating, by the voltage converter, a zero cross signal that indicates whether a current from the voltage converter has crossed zero;
sampling the shed comparison signal for a first number of clock cycles to generate shed comparison sampled values;

sampling the zero cross signal for a second number of clock cycles to generate zero cross sampled values, wherein the second number of clock cycles are less than the first number of clock cycles;

monitoring the shed comparison sampled values for the first number of clock cycles and the zero cross sampled values for the second number of clock cycles; and causing a change between a shed state and an unshed state corresponding to a portion of a plurality of transistors of the voltage converter based on determining either the shed comparison sampled values have essentially a first same value or the zero cross sampled values have essentially a second same value.

13. The method of claim 12, wherein:
sampling the shed comparison signal comprises delaying the shed comparison signal by a first delay before determining the shed comparison sampled values, and sampling the zero cross signal comprises delaying the zero cross signal by a second delay before determining the shed comparison sampled values, the second delay being less than the first delay.

14. The method of claim 12, wherein:
determining the change between the shed state and the unshed state based on the shed comparison sampled values comprises determining the shed comparison sampled values are below the same value threshold for the first number of clock cycles, and determining the change between the shed state and the non-shed state based on the zero cross sampled values comprises determining the zero cross sampled values are essentially at the same second value for the second number of clock cycles.

15. The method of claim 12, further comprising:
generating a shed signal indicating whether the voltage converter should be in the shed state or the unshed state, when the shed signal indicates the voltage converter should be in the shed state, using the shed signal to power off the portion of the plurality of transistors in the voltage converter; and when the shed signal indicates the voltage converter should move from the shed state to the unshed state, using the shed signal to power on the portion of the plurality of the transistors in the voltage converter.

16. The method of claim 12, wherein the reference voltage is adjusted for temperature changes.

17. The method of claim 12, further comprising:
generating a current limit signal when a current limit is detected in the voltage converter, wherein the current limit is detected when the current goes above a current limit threshold; and using the current limit signal to change the voltage converter from the shed state to the unshed state.

18. The method of claim 17, further comprising:
blanking the current limit signal for a time delay after a current limit signal changes the voltage converter from the shed state to the unshed state.

19. The method of claim 17, further comprising:
blanking a PWM comparison signal that is configured to turn off high side transistors from the plurality of transistors, the logic using the current limit signal to blank the PWM comparison signal for a delay while the voltage converter changes between the shed state and the unshed state.

20. A voltage converter comprising:
means for generating a shed comparison signal that is based on a comparison of a voltage detected from a voltage converter to a reference voltage;

means for generating a zero cross signal that indicates whether a current detected from the voltage converter has crossed zero;

means for sampling the shed comparison signal for a first number of clock cycles to generate shed comparison sampled values;

means for sampling the zero cross signal for a second number of clock cycles to generate zero cross sampled values, wherein the second number of clock cycles are less than the first number of clock cycles; and means for determining a change between a shed state and an unshed state corresponding to a portion of a plurality of transistors of the voltage converter based on monitoring the shed comparison sampled values for the first number of clock cycles and the zero cross sampled values for the second number of clock cycles to determine either the shed comparison sampled values have essentially a first same value or the zero cross sampled values have essentially a second same value.

\* \* \* \* \*